United States Patent [19]

Haruno

[11] Patent Number: 5,705,115
[45] Date of Patent: Jan. 6, 1998

[54] METHOD FOR THE PREPARATION OF AN AIR-PERMEABLE PLUG MEMBER

[75] Inventor: Hiroshi Haruno, Tokyo, Japan

[73] Assignee: Shin-Etsu Polymer Co., Ltd., Tokyo, Japan

[21] Appl. No.: 677,616

[22] Filed: Jul. 8, 1996

Related U.S. Application Data

[62] Division of Ser. No. 639,791, Apr. 29, 1996.

[51] Int. Cl.$^6$ .................................................. B29C 67/22
[52] U.S. Cl. ........................................ 264/321; 264/323
[58] Field of Search .................................. 264/321, 323

[56] References Cited

U.S. PATENT DOCUMENTS

| | | | |
|---|---|---|---|
| 2,327,001 | 8/1943 | Schott | 264/321 |
| 2,383,110 | 8/1945 | Cooper | 264/321 |
| 2,575,259 | 11/1951 | Cox et al. | 264/321 |
| 2,698,272 | 12/1954 | Clapp et al. | 264/321 |
| 2,891,288 | 6/1959 | Daley | 264/321 |
| 3,175,030 | 3/1965 | Geen | 264/321 |
| 3,297,803 | 1/1967 | Meisel, Jr. et al. | 264/321 |
| 3,300,558 | 1/1967 | Grant et al. | 264/321 |
| 3,961,445 | 6/1976 | Rack | 264/321 |
| 4,507,345 | 3/1985 | Stoll et al. | 264/321 |
| 4,776,356 | 10/1988 | Jou et al. | 264/321 |

FOREIGN PATENT DOCUMENTS

| | | | |
|---|---|---|---|
| 250618 | 2/1963 | Austria | 264/321 |
| 758237 | 4/1971 | Belgium | 264/321 |
| 1418259 | 10/1964 | France | 264/321 |
| 1103005 | 5/1958 | Germany | 264/321 |
| 41-19708 | 11/1966 | Japan | 264/321 |

*Primary Examiner*—Allan R. Kuhns
*Attorney, Agent, or Firm*—McAulay Fisher Nissen Goldberg & Kiel, LLP

[57] ABSTRACT

An air-permeable plug member of a rubbery material useful as a stopper of the opening in a vessel, for example, for the culture of microorganisms and a method for the preparation thereof, by which the air permeability of the plug member can be freely controlled, are described. The plug member is characterized by the unique cellular structure consisting of a combination of a closed-cell structure and an open-cell structure in an appropriate proportion. Such a plug member can be prepared by first preparing a foamed rubber body consisting of a closed-cell structure only and then subjecting the same to a foam-breaking treatment by passing the body through a gap between, for example, a pair of rollers of which the gap width is 10 to 50% of the thickness or diameter of the body so that the cell walls of the closed-cell structure are partly broken to produce an open-cell structure.

2 Claims, 4 Drawing Sheets

FIG. IA
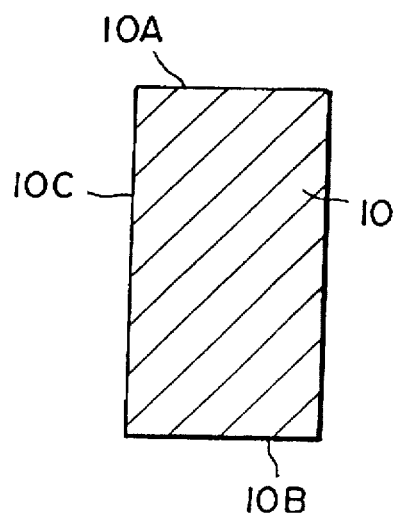
FIG. IB
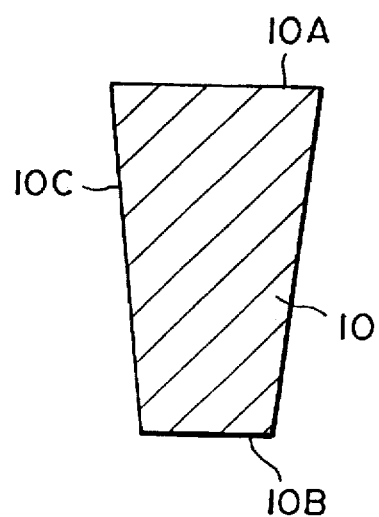
FIG. IC
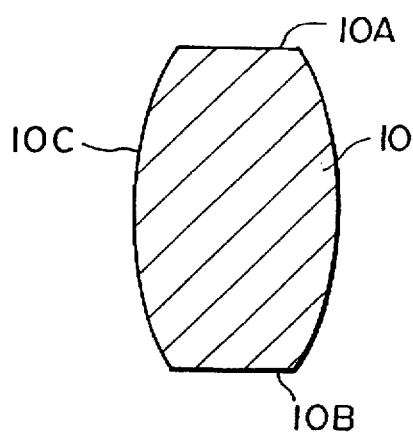
FIG. ID
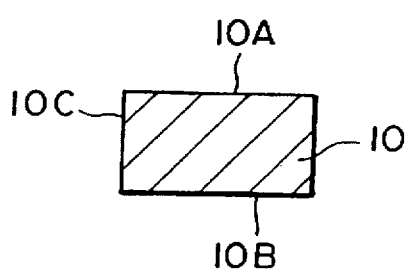
FIG. IE
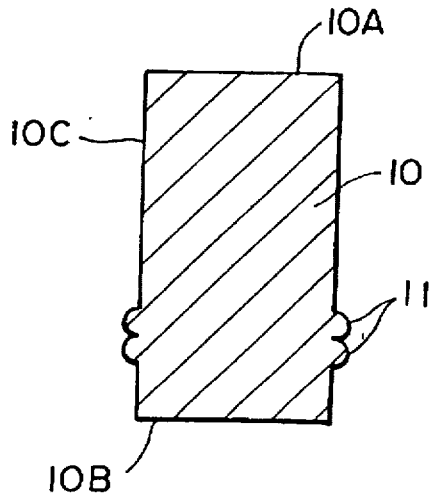

METHOD FOR THE PREPARATION OF AN AIR-PERMEABLE PLUG MEMBER

This is a division of application Ser. No. 08/639,791 filed Apr. 29, 1996.

BACKGROUND OF THE INVENTION

The present invention relates to an air-permeable plug member which is used as a stopper of the openings in a vessel for culturing of microorganisms or for raising or growing aseptic animals or plants as well as a method for the preparation thereof.

It is conventional and traditional that an opening in a vessel for culturing of microorganisms including bacteria, viruses and the like or raising or growing aseptic animals or plants is stoppered with an air-permeable plug member such as cotton plugs, paper plugs, metal plugs, e.g., aluminum and stainless steel plugs, and plastic plugs having air permeability as well as caps having these plug members built therein. Each of these conventional air-permeable plug members has its own advantages and disadvantages. For example, cotton plugs are advantageous because they have good air permeability and can be sterilized at a relatively high temperature while the problems thereof are that the preparation procedure thereof is relatively time-consuming and they are not suitable for repeated uses if not to mention the low reliability of their performance depending on the preparation procedure not to ensure stability of air permeation. Paper plugs have a disadvantage that they are under limitation in the method of sterilization and the method of gamma-ray sterilization and flame sterilization cannot be applied thereto as an inherency of paper materials. Further, metal plugs and plastic plugs have a disadvantage that they are susceptible to contamination when used prolongedly or repeatedly. Besides, plastic plugs are also under limitations relative to the method of sterilization as an inherency of plastic materials like paper plugs.

In view of the above described problems, Japanese Patent Publication 51-44191 proposes a plug member having excellent heat resistance and insusceptibility to contamination even by the use for a long period of time. The plug member disclosed there is a foamed body of a silicone rubber having an open-cell structure. Namely, the foamed body of a silicone rubber has a cellular structure as is schematically illustrated in FIG. 5 of the accompanying drawing by a cross sectional view in which each cell communicates with the other cells. This plug member can be subjected to a high-temperature sterilization treatment by virtue of the high heat stability of silicone rubbers and the open-cell structure acts something like a "swan's neck structure" to be freed from the troubles due to contamination.

Even in the above mentioned plug members, it is indispensable to regulate the air permeability of the foamed silicone rubber depending on the microorganisms to be cultured in the vessel stoppered with the air-permeable plug member. The air permeability of the plug member of a foamed silicone rubber can be controlled by carefully adjusting the formulation of the foamable silicone rubber composition and controlling the conditions for foaming and curing though with various troubles. In addition, plug members having different rates of foaming have different hardness so as to affect the workability therewith or adaptability to the vessels for the culture of microorganisms or raising or growing of aseptic animals or plants.

SUMMARY OF THE INVENTION

The present invention accordingly has an object, in view of the above described problems and disadvantages in the conventional air-permeable plug members, to provide an improved air-permeable plug member which can be imparted with any desired air permeability from foamed rubber bodies of identical foaming rate prepared from foamable rubber compositions of the identical formulation and excellent adaptability to the opening of a vessel as well as a method by which the above mentioned air-permeable plug members having accurately controlled air permeability can be prepared with high productivity.

Thus, the present invention provides an air-permeable plug member having a cellular structure of a rubbery material consisting both of a closed-cell structure, in which each cell is isolated from the other cells by the cell walls, and an open-cell structure, in which the walls of each cell are partly broken so that each cell communicates with the other cells. It is preferable that the air-permeable plug member of the invention has an apparent open-cell ratio defined later in the range from 20% to 90% or, more preferably, from 40% to 80%.

The above defined air-permeable plug member of the invention having a cellular structure of a foamed rubber consisting of a closed-cell structure and an open-cell structure in combination is prepared by a method which comprises the steps of:

(a) shaping a foamed body of a rubber having a closed-cell structure in the form of a plug member; and (b) subjecting the foamed rubber body obtained in step (a) to a foam-breaking treatment so as to break the walls of a part of the closed cells.

The above mentioned foam-breaking treatment of a foamed rubber body having a closed-cell structure is performed by passing the foamed rubber body through a gap between a pair of rollers or between two oppositely facing pressure plates, of which the width of the gap is in the range from 10% to 50% of the thickness or diameter of the foamed rubber body of the closed-cell structure so as to collapse a part of the closed cells by compression.

While the foamed rubber body having a closed-cell structure obtained in step (a) of the inventive method has a skin layer on all of the top surface, bottom surface and side surface, it is preferable to remove the skin layer on the top and bottom surfaces so as to have air passages communicating between the top and bottom surfaces.

BRIEF DESCRIPTION OF THE DRAWINGS

FIGS. 1A, 1B, 1C, 1D and 1E are each a vertical cross sectional view of the inventive air-permeable plug member of a different configuration.

FIGS. 8A, 8B, 8C and 8D are each a schematic illustration for the foam-breaking apparatus used in the preparation of the inventive air-permeable plug member.

DETAILED DESCRIPTION OF THE PREFERRED EMBODIMENTS

Figure 2A:
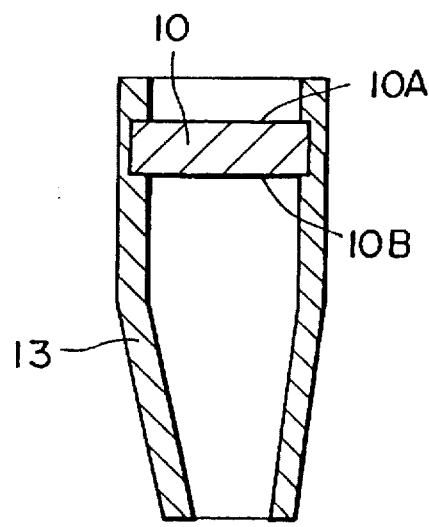
FIGS. 2A and 2B are each a vertical cross sectional view of the inventive air-permeable plug member of a still different configuration as a part of a cap.

As is clear from the above given description, the most characteristic feature of the inventive air-permeable plug member consists in the unique cellular structure thereof which is a combination of a closed-cell structure and open-cell structure. The air-permeability of the inventive air-permeable plug member largely depends on and can be controlled by modifying the proportion of the closed cells and the open cells. Namely, the air-permeability is decreased by increasing the proportion of the closed cells to the open cells so that such a plug member is suitable as a stopper of a vessel used in the culturing of anaerobic microorganisms while the air-permeability is increased by decreasing the volume proportion of the closed cells to the open cells so that such a plug member is suitable as a stopper of a vessel used in the culturing of aerobic microorganisms because air can permeate through the broken cell walls to make communication between cells. Namely, air-permeable plug members having widely different values of air-permeability can be obtained from foamed rubber bodies prepared with identical formulations. The fitting behavior of the air-permeable plug member inserted into an opening of a vessel as a stopper also depends on the volume proportion of the closed and open cells and, generally speaking, better fitting can be obtained with a larger value of this volume proportion.

With an object to improve the sealability of the opening of a vessel stoppered with the inventive air-permeable plug member, it is optional to have the plug member coated with a RTV silicone rubber composition on the side surface coming into contact with the inner wall of the opening or to apply a separately prepared skin film thereto.

The above defined air-permeable plug member having a unique cellular structure can be prepared by first preparing a foamed rubber body having a cellular structure consisting of closed cells only and then subjecting the foamed rubber body to a foam-breaking treatment so as to break a part of the walls of the closed cells to form passages for air by which each cell communicates with the others.

The above mentioned foam-breaking treatment can be performed by passing the foamed rubber body of closed cells through a gap of an appropriate width between a pair of rollers or pressure plates to effect collapsing of a part of the closed cells by compression. The width of the gap through which the foamed rubber body is passed and compressed is in the range from 5% to 60% or, preferably; from 10% to 50% or, more preferably, from 15% to 25% of the thickness of the foamed rubber body or, when the foamed rubber body is cylindrical, of the diameter of the cylindrical rubber body depending on the desired rate of foam breaking. When the width of the gap is too small and the rate of compression is too large, the pressure added to the foamed rubber body is so large eventually to destroy the foamed rubber body per se or to make defects or fissures on the surface. When the width of the gap is too large and the rate of compression is too small, on the other hand, the foam breaking effect is insufficient not to give a desired air permeability although this deficiency can be partly remedied by repeating the compressing treatment several times.

The material of the rollers or pressure plates used in this foam-breaking treatment is not particularly limitative including reinforced concrete, ceramics, metallic materials, e.g., iron, aluminum and stainless steel, plastic resins, e.g., polypropylene, fluorocarbon resins, polyimide, polyamide and polyacetals.

Though not particularly limitative depending on the object of use of the inventive air-permeable plug member, the extent of the foam-breaking treatment is controlled in such a range that the apparent open-cell ratio Q defined below is in the range from 20% to 90% or, preferably, from 40% to 80%. The above mentioned apparent open-cell ratio Q in % is defined by the equation $$Q\ (\%) = (B-A)/(C-B) \times 100,$$

in which A is the weight of the plug member as prepared, B is the weight of the plug member after full soaking of the open cells with water and C is the weight of water in a volume just equal to the volume of the plug member. Full soaking of the plug member can be accomplished by repeating the cycles of squeezing and releasing of the plug member in water until no further increase can be detected in the water-soaked plug member.

When the above mentioned foam breaking treatment of a foamed rubber body is performed by using a pair of rollers, the velocity of rotation of the rollers are controlled in such a way that the peripheral velocity of the rollers is in the range from 3.0 meters/minute to 70 meters/minute or, preferably, from 5.0 meters/minute to 50 meters/minute or, more preferably, from 10 meters/minute to 30 meters/minute though depending on the thickness or diameter of the foamed rubber body. When the velocity is too low, a decrease is caused in the productivity of the foam breaking treatment while, when the velocity is too high, the foamed rubber body per se is destroyed or damaged. Since the extent of foam breaking is naturally increased by repeating the compression treatment of the foamed rubber body by passing through the gap, these conditions must be adequately selected by conducting a test procedure beforehand.

When the foam breaking treatment is performed by using a pair of pressure plates, the efficiency of foam breaking can be improved by moving the respective plates in reversed directions so as to give a shearing force to the foamed rubber body. Similarly, a shearing force can be given to the foamed rubber body also in the treatment using a pair of rollers by rotating the rollers in such velocities that the peripheral velocity of a toiler substantially differs from that of the other roller. The efficiency of the foam breaking treatment can also be improved by using rollers or pressure plates having a surface imparted with ruggedness by sandblasting or embossing.

Since the inventive air-permeable plug member is used as a stopper of a vessel for the culture of microorganisms as the principal application, the plug member is desirably made from a material having low or no toxicity and free from the problem of contamination of the cultured material or culture medium. Examples of suitable rubbery material in this regard include silicone rubbers, SEP rubbers, chlorinated polyethylenes and the like though not particularly limitative thereto, of which silicone rubbers are particularly preferable due to the physiological inertness and hydrophobicity not to cause propagation of microorganisms on the surface of the plug member per se or contamination of the culture medium. In particular, an air-permeable plug member of a silicone rubber as vulcanized is subjected to a treatment for the removal of low molecular weight oligomeric constituents by heating under a reduced pressure of, for example, 50 to 3 mmHg to decrease the overall amount thereof not to exceed 2% by weight or, preferably, 0.75% by weight. Silicone rubbers are preferred also in respect of the working efficiency for the formation of closed cells by virtue of the proximity of the vulcanization temperature and the blowing temperature for foaming.

In the following, the present invention is described in more detail by making reference to the accompanying drawing.

Figure 4:
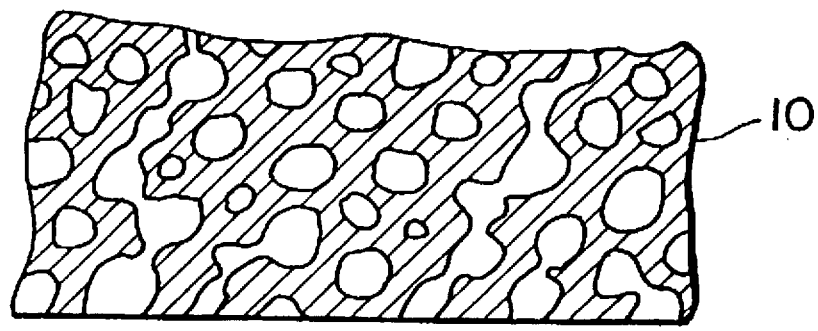
FIG. 4 is a schematic cross sectional view showing the cellular structure of the inventive air-permeable plug member.
Figure 5:
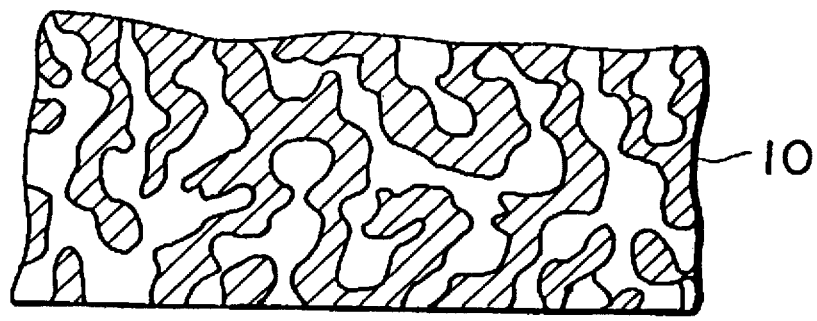
FIG. 5 is a schematic cross sectional view showing the cellular structure of the conventional air-permeable plug member.

FIGS. 1A to 1E and FIGS. 2A and 2B each illustrate an embodiment of the inventive air-permeable plug member by a vertical cross sectional view either as such or as combined with other parts to be used as a stopper or cap of a vessel for culturing of microorganisms. The plug member 10 illustrated in FIG. 1A has a simple cylindrical configuration and has a cellular structure schematically illustrated in FIG. 4 consisting of closed and open cells in combination. If necessary in order to ensure air permeability or air communication between the top and bottom surfaces, the skin layers 10A and 10B on the top surface and bottom surface, respectively, are removed while the skin layer 10C formed on the side surface of the plug member is usually left unremoved so as to ensure a good contacting condition with the inner surface of the opening of the vessel. As is illustrated in FIGS. 1B to 1E, the plug member can be shaped in the form of a truncated cone, barrel, pellet or cylinder having one or more ring ribs 11, respectively, besides the cylindrical form of FIG. 1A.

Figure 2B:
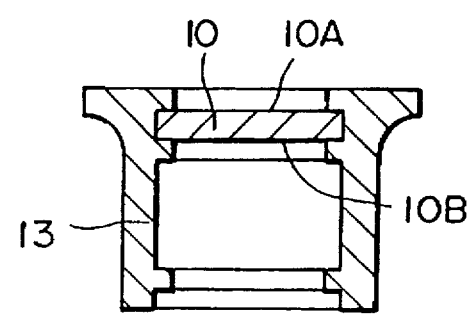

FIG. 2A illustrates a combination plug consisting of an air-permeable rubbery member 10 having a composite cellular structure according to the invention in the form of a pellet or disk, which is supported by a supporting body 13 of the plug made from a relatively rigid material such as polyethylene or other plastics or a hard rubber. FIG. 2B illustrate a cap consisting of an air-permeable rubbery body 10 supported by a rigid frame 13.

The air-permeable rubber plug member of the invention can be prepared by the procedure including the steps of mixing of a foamable and vulcanizable rubber composition, preliminary shaping of the rubber composition, foaming, heat treatment and foam breaking treatment. For example, a silicone rubber-based foamable and vulcanizable composition is prepared by uniformly blending a silicone rubber compound consisting of an organopolysfioxane and an inorganic reinforcing filler with an organic peroxide such as benzoyl peroxide as a vulcanizing agent and an organic blowing agent such as azobisisobutyronitrile on a suitable rubber processing machine such as rubber-mixing rollers and the like. It is optional that this foamable and vulcanizable rubber composition is admixed with a coloring agent such as organic and inorganic pigments and a heat-resistance improver such as titanium dioxide, iron oxide, ceric oxide and the like.

In the next place, the rubber composition prepared in the above described manner is subjected to preliminary shaping, for example, by extrusion molding and the preliminarily shaped body of the rubber composition is heated in a metal mold under compression or heated in an open oven so that the rubber composition is foamed and vulcanized to have a cellular structure consisting of closed cells only. The conditions of the above described steps are adjusted so that the diameter of the thus formed closed cells is in the range from 0.03 to 1 mm or, preferably, from 0.05 to 0.5 mm. Thereafter, though optional, a heating treatment is undertaken in an open oven or under a reduced pressure at a temperature in the range from 150° C. to 250° C. for a length of time of 1 to 24 hours to remove the residue formed by the decomposition of the organic peroxide or oligomeric organopolysiloxanes.

Figure 3A:
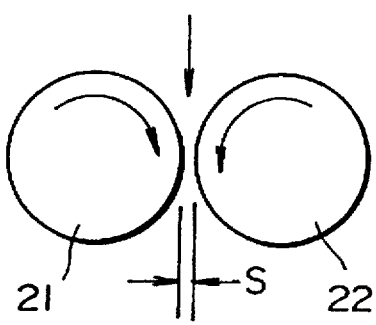
Figure 3B:
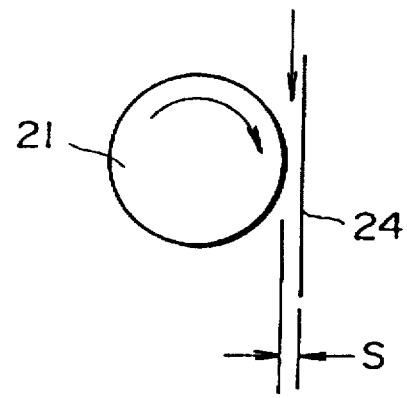
Figure 3C:
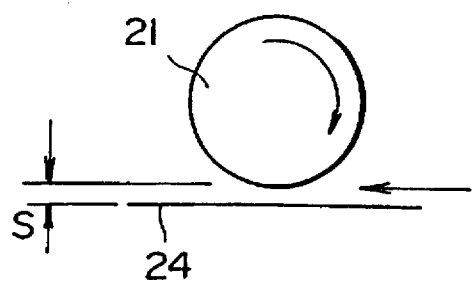
Figure 3D:
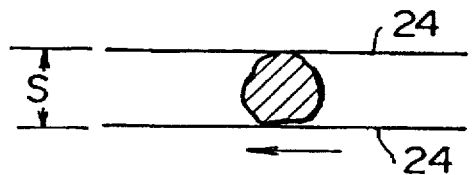

In the foam-breaking treatment to follow, the above obtained cellular body of foamed silicone rubber consisting of closed cells is passed through a gap between two rollers 21,22 as is illustrated in FIG. 3A. The width S of the gap between the two rollers is set at 10 to 50% or, preferably, 15 to 25% of the thickness or diameter of the foamed rubber body and the relative peripheral velocity of the roller surfaces is set at 3.0 to 70 meters/minute or, preferably, 10 to 30 meters/minute so as to give a shearing force to the foamed rubber body passing through the gap. In place of a pair of rollers 21,22 illustrated in FIG. 3A, a single roller 21 is held oppositely to a vertical or horizontal bed 24 keeping a gap of the width S as is illustrated in FIGS. 3B and 3C, respectively, and the roller 21 is rotated or the bed 24 is moved so that the foamed rubber body introduced into the gap is compressed and receives a shearing force. Further, as is illustrated in FIG. 3D, a pair of pressure plates 24, 24 are held in parallel keeping a gap of a width S and at least one of them is moved relative to the other so that a foamed rubber body sandwiched between the pressure plates 24,24 is compressed by the pressure plates 24,24 under a shearing force.

When a desired effect of foam breaking cannot be obtained in the foamed rubber body by a single foam-breaking treatment mentioned above, it is optional to repeat the treatment several times or, for example, up to 7 times until the desired foam breaking effect can be obtained.

It is noted that the inventive air-permeable plug member having a cellular structure as a combination of closed cells and open cells has a lower hardness than a foamed rubber body of closed cells only assuming that the pore volumes or rates of foaming are identical between them. This fact should be taken into consideration in the formulation of the foamable and vulcanizable rubber composition as well as the foaming and vulcanizing conditions thereof.

In the following, examples are given to particularly illustrate various embodiments of the present invention.

EXAMPLE 1

A foamable and vulcanizable silicone rubber composition was prepared by uniformly blending, on a two-roller mill, 100 parts by weight of a silicone rubber compound consisting of an organopolysfioxane containing 0.15% by moles of vinyl groups based on overall organic groups and a reinforcing silica filler with a combination of 0.15 part by weight of benzoyl peroxide and 1.0 part by weight of dicumyl peroxide as a vulcanizing agent and 2.0 parts by weight of azobisisobutyronitrile in a powdery form as a blowing agent. The silicone rubber composition was subjected to preliminary shaping by extrusion molding through an extruder machine and the thus shaped rubber composition was introduced into a metal mold and heated therein for 20 minutes in an oven kept at 230° C. to effect vulcanization and foaming into a foamed silicone rubber body of closed cells in the form of a truncated cone as is illustrated in FIG. 1B having diameters of 40 mm and 30 mm on the top and bottom surfaces, respectively, and a height of 60 mm. The foaming or expansion rate of this foamed silicone rubber body was 350% and the rubber hardness was 25 as determined by using an Ascar C rubber hardness tester.

In the next place, the foamed silicone rubber body was, after removal of the skin layers formed on the top and bottom surfaces, passed twice through a gap of 9 mm width between a roller and a vertically held bed as is illustrated in FIG. 3B at a velocity of 10 meters/minute by rotating the roller to effect a foam breaking treatment. The foam breaking treatment was followed by a heat treatment at 200° C. for 10 hours. The thus prepared air-permeable plug member had an apparent open-cell ratio of 50%.

Figure 6:
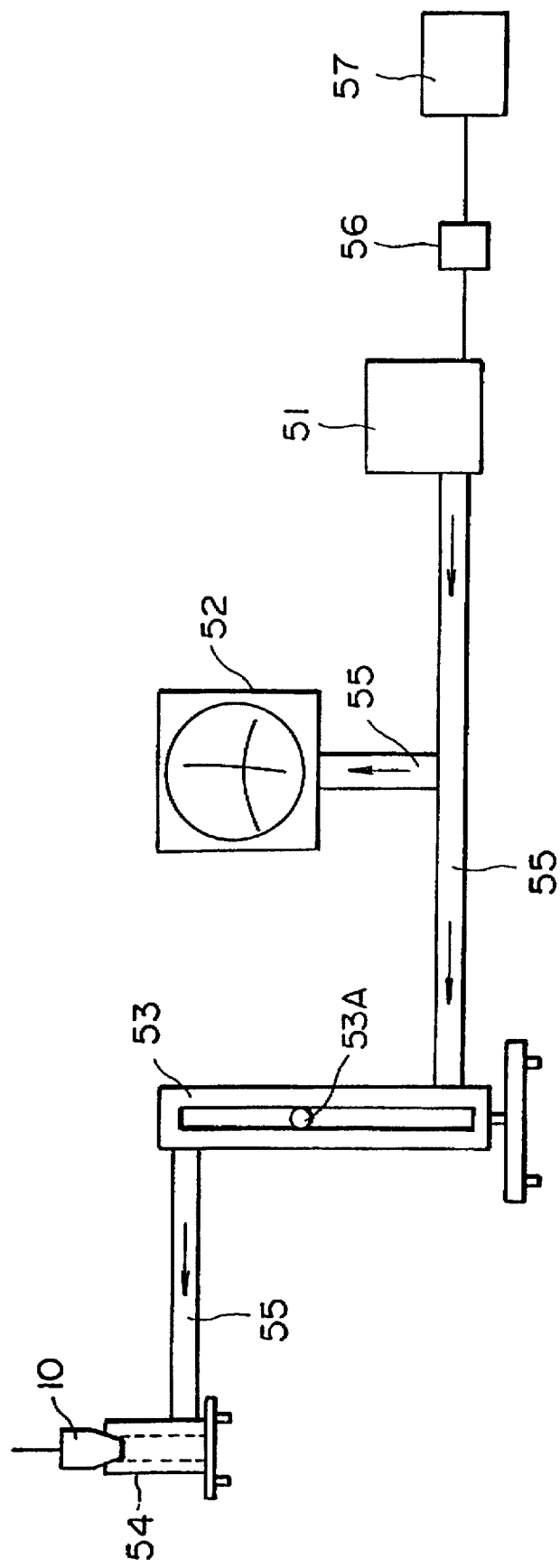
FIG. 6 is a schematic illustration of the apparatus system for the measurement of the air-permeability of the air-permeable plug member.

The thus obtained air-permeable plug member was subjected to the following evaluation tests. Thus, the air permeability of the plug member was measured by using the instrumental assembly schematically illustrated in FIG. 6 comprising an air blower 51, microdifferential pressure gauge 52, flow meter 53 having a float 53A and plug holder 54 holding the plug member 10 under testing inserted thereinto connected together with rubber tubes 55. The flow rate of air by the air blower 52 was adjusted by means of the variable transformer 56 connected to a power source 57 in such a way that the pressure difference indicated by the microdifferrential pressure gauge 52 was 26 mmAq to record the flow rate of air determined there by the flow meter 52. The thus determined air permeability of the air-permeable plug member was 50 ml/minute. This result is shown also in Table 1 below, which summarizes the results obtained in the further Examples and Comparative Examples together with the data obtained With three kinds of conventional cotton plugs as controls.

Further, a test tube containing 25 ml of water was stoppered with the air-permeable plug member and kept standing for 15 days at 30° C. to determine the weight decrease by the evaporation of water through the air-permeable plug member to give the result shown in Table 1 below.

The air-permeable plug member was used as a stopper of a test tube in which the IAM 1247 strain of the microorganisms *Candida maltosa* was shake-cultured by using a standard culture medium at 27° C. for 12 hours and the light absorbance of the culture medium was determined at a wavelength of 660 nm in a cell of 1 cm optical path length as a measure of the propagation of the microorganisms. The result is shown also in Table 1.

EXAMPLE 2

The experimental procedure was substantially the same as in Example 1 except that the width of the gap between the roller and bed was decreased from 9 mm to 8 mm and the rubber body was passed three times through the gap. The thus obtained air-permeable plug member had an air permeability of 350 ml/minute. The results of other evaluation tests are shown in Table 1.

EXAMPLE 3

The experimental procedure was substantially the same as in Example 1 except that the width of the gap between the roller and bed was decreased from 9 mm to 7 mm and the rubber body was passed seven times through the gap. The thus obtained air-permeable plug member had an air permeability of 1000 ml/minute. The results of other evaluation tests are shown in Table 1.

COMPARATIVE EXAMPLES 1 to 3

Air-permeable plug members having the same dimensions as those prepared in the above described Examples, of which the cellular structure consisted of open cells only, were prepared from foamable silicone rubber compositions of the same formulation as above excepting modification of the amount of the blowing agent. An air permeability of the plug members at the same level as in the above described Examples 1, 2 and 3 could be obtained only by varying the rate of foaming in the range from 250% to 500% to give a rubber hardness in the range from 5 to 30.

TABLE 1

|  | Example | | | Comparative Example | | | Cotton plug | | |
| --- | --- | --- | --- | --- | --- | --- | --- | --- | --- |
|  | 1 | 2 | 3 | 1 | 2 | 3 | 1 | 2 | 3 |
| Rate of foaming, % | 350 | 350 | 350 | 250 | 320 | 500 |  |  |  |
| Hardness | 25 | 14 | 8 | 30 | 11 | 5 |  |  |  |
| Apparent open-cell ratio, % | 50 | 70 | 90 | 100 | 100 | 100 |  |  |  |
| Air permeability, ml/minute | 50 | 350 | 1000 | 40 | 320 | 900 | 60 | 400 | 1200 |
| Water evaporation, ml | 0.1 | 0.4 | 0.9 | 0.1 | 0.3 | 0.8 | 0.1 | 0.5 | 1.2 |
| Microbial growth, absorbance | 6.65 | 6.68 | 7.13 | 6.56 | 6.82 | 7.11 | 6.69 | 6.88 | 7.25 |

What is claimed is:

1. A method for the preparation of an air-permeable plug member having a cellular structure of a foam rubbery material consisting of a closed-cell structure and an open-cell structure which comprises the steps of:

a) shaping a foamed body of a rubbery material having a closed-cell structure only, the diameter of the closed-cells being the range from 0.03 to 1 mm; and b) subjecting the foamed rubber body obtained from step a) to a foam-breaking treatment so as to break the walls of a part of the closed cells to create an apparent open cell ratio in the range from 20% to 90% by passing the foamed rubber body through a gap between a pair of rollers or between two oppositely facing pressure plates, the width of the gap being the range from 10% to 50% of the thickness or diameter of the foamed rubber body having the closed-cell structure, wherein the peripheral velocity of the rollers and pressure plates is in the range from 3.0 to 70 meters per minute.

2. The method for the preparation of an air-permeable plug member having a cellular structure of a foamed rubbery material consisting of a closed-cell structure and an open-cell structure as claimed in claim 1 in which an air-impermeable skin layer formed in step (a) on the top surface and bottom surface of the foamed body is removed before step (b).

* * * * *